US010443880B2

(12) United States Patent
Evans et al.

(10) Patent No.: US 10,443,880 B2
(45) Date of Patent: Oct. 15, 2019

(54) COMBINED ISOLATION VALVE AND CHECK VALVE WITH INTEGRAL FLOW RATE PRESSURE, AND/OR TEMPERATURE MEASUREMENT AND FIELD CONFIGURABILITY

(71) Applicant: FLUID HANDLING LLC., Morton Grove, IL (US)

(72) Inventors: Stanley Paul Evans, Tinley Park, IL (US); Mrinalini Litoriya, Evanston, IL (US); Mahesh Nair, Evanston, IL (US); Florin Rosca, Niles, IL (US); Deep Trambadia, Vadodara (IN); Amitkumar Welekar, Vadodara (IN)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 15/821,084

(22) Filed: Nov. 22, 2017

(65) Prior Publication Data
US 2018/0156488 A1 Jun. 7, 2018

Related U.S. Application Data

(60) Provisional application No. 62/425,289, filed on Nov. 22, 2016.

(51) Int. Cl.
*F24F 11/70* (2018.01)
*F16K 37/00* (2006.01)
(Continued)

(52) U.S. Cl.
CPC ............ *F24F 11/70* (2018.01); *F16K 5/06* (2013.01); *F16K 15/03* (2013.01); *F16K 15/18* (2013.01);
(Continued)

(58) Field of Classification Search
CPC .. F24F 11/70; F16K 5/06; F16K 15/18; F16K 37/0091; Y10T 137/87917
(Continued)

(56) References Cited

U.S. PATENT DOCUMENTS

| 1,367,911 A | 2/1921 | Koplin |
| 2,715,414 A | 8/1955 | Kinzbach et al. |

(Continued)

FOREIGN PATENT DOCUMENTS

| AT | 204340 B | 7/1959 |
| EP | 0438424 B1 | 9/1989 |

(Continued)

OTHER PUBLICATIONS

English language translation of AT204340B.
(Continued)

*Primary Examiner* — Kevin L Lee
(74) *Attorney, Agent, or Firm* — Ware, Fressola, Maguire & Barber LLP

(57) ABSTRACT

The present invention allows for a combination valve in a hydronic HVAC system that functions as an isolation valve; a check valve; and as a device for measuring fluid parameters, such as flow rate, pressure, and/or temperature, and also allows for the isolation valve to be configured in the field to be mounted either in a straight 180° or an angled 90° orientation, as well as at an intermediate angle. The new combination of isolation valve, check valve, with embedded sensors for flow rate, pressure, and/or temperature measurement provides a more compact product envelope that achieves space savings, e.g., by eliminating the need for separate components in an HVAC system, such as separate isolation valves, check valves, flow meters, pressure gages, and/or thermometers.

6 Claims, 14 Drawing Sheets

Combination Valve in Straight (180°) Orientation

(51) Int. Cl.
- *F16K 5/06* (2006.01)
- *F16K 15/18* (2006.01)
- *F16K 15/03* (2006.01)
- *F16K 27/02* (2006.01)
- *F24F 11/89* (2018.01)

(52) U.S. Cl.
CPC ........ *F16K 15/181* (2013.01); *F16K 27/0209* (2013.01); *F16K 37/005* (2013.01); *F16K 37/0091* (2013.01); *F24F 11/89* (2018.01); *Y10T 137/87917* (2015.04)

(58) Field of Classification Search
USPC .................................................. 137/613, 270
See application file for complete search history.

(56) References Cited

U.S. PATENT DOCUMENTS

| | | | |
|---|---|---|---|
| 3,218,024 A | 11/1965 | Kroekel | |
| 3,420,493 A | 1/1969 | Kraft | |
| 4,402,340 A | 9/1983 | Lockwood, Jr. | |
| 5,406,979 A | 4/1995 | McHugh | |
| 5,566,711 A * | 10/1996 | Glansk et al. | F16K 1/10 137/557 |
| 5,568,825 A | 10/1996 | Faulk | |
| 6,182,753 B1 | 2/2001 | Schultz | |
| 6,220,290 B1 | 4/2001 | Lomax | |
| 6,357,467 B1 | 3/2002 | Ringer | |
| 6,574,978 B2 | 6/2003 | Flynn et al. | |
| 7,174,915 B2 * | 2/2007 | Fazekas | F16K 5/06 137/613 |
| 7,445,025 B2 | 11/2008 | Shafique et al. | |
| 7,478,540 B2 | 1/2009 | Flynn et al. | |
| 8,596,296 B2 * | 12/2013 | Rasmussen | F16K 1/526 137/315.04 |
| 9,366,582 B2 | 6/2016 | Rosca et al. | |
| 2012/0037833 A1 | 2/2012 | Miyazaki et al. | |
| 2014/0360604 A1 | 12/2014 | Rosca et al. | |
| 2016/0054009 A1 | 2/2016 | Rothman et al. | |
| 2016/0138723 A1 | 5/2016 | Al-Amri | |
| 2016/0363468 A1 | 12/2016 | Reck et al. | |

FOREIGN PATENT DOCUMENTS

| | | |
|---|---|---|
| EP | 3073205 A1 | 3/2015 |
| WO | 2012128645 A1 | 9/2012 |

OTHER PUBLICATIONS

"Triple Duty Valves," Bell & Gossett, bellgossett.com, Feb. 11, 2016. http://web.archive.org/web/20160212054308/http://bellgossett.com/hydronic-plumbing-accessories/pump-accessories/triple-duty-valve/.

Hegberg, M.C., "Control valve selection for hydronic systems," ASHRAE Journal, Nov. 2000, 42(11):p. 33. http://search.proquest.com/openview/c235be525b3b1e700d73d68d0891bd8d/1?pq-origsite=gscholar.

Avery, G., "Selecting Valves for Variable Flow Hydronic Systems," ASHRAE Journal, Sep. 2005, 47(9), pp. 12-14, 16. http://search.proquest.com/openview/5a122abafa4fd991f8b8986a7a3a7aef/1?pq-origsite=gscholar.

* cited by examiner

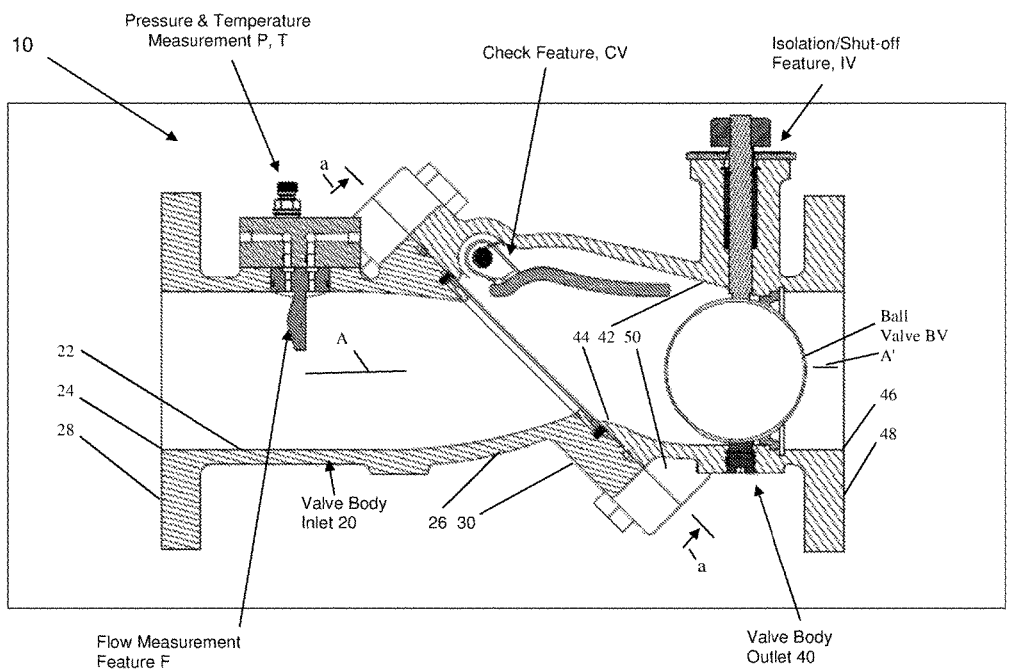
Figure 1A: Combination Valve in Straight (180°) Orientation

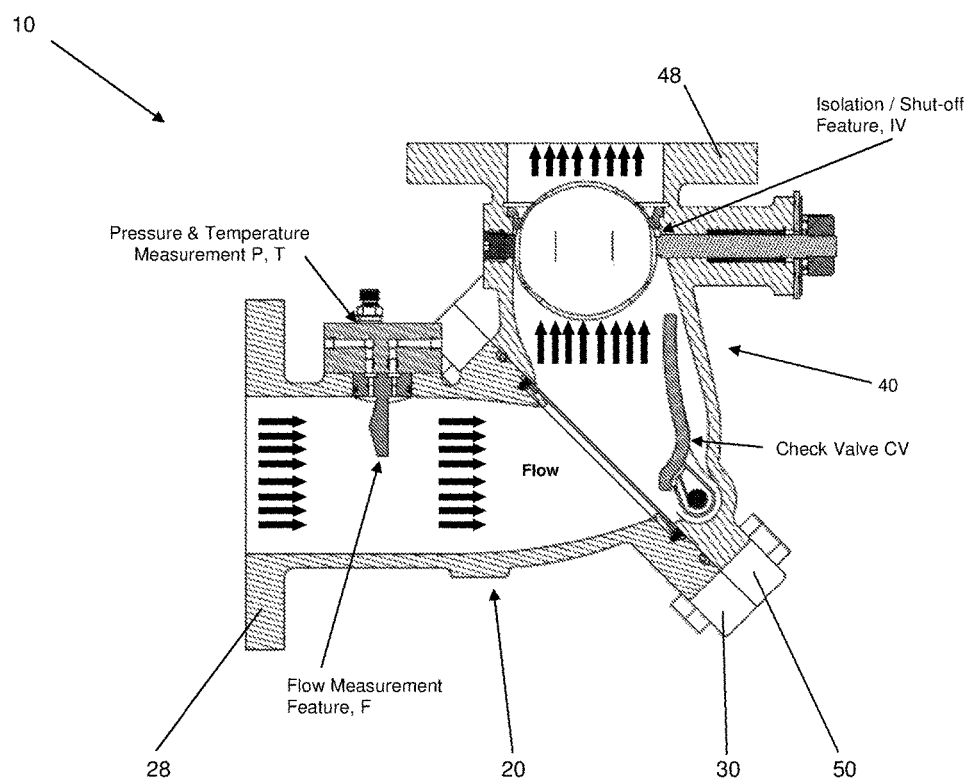
Figure 2A: Combination Valve in Angle (90°) Orientation

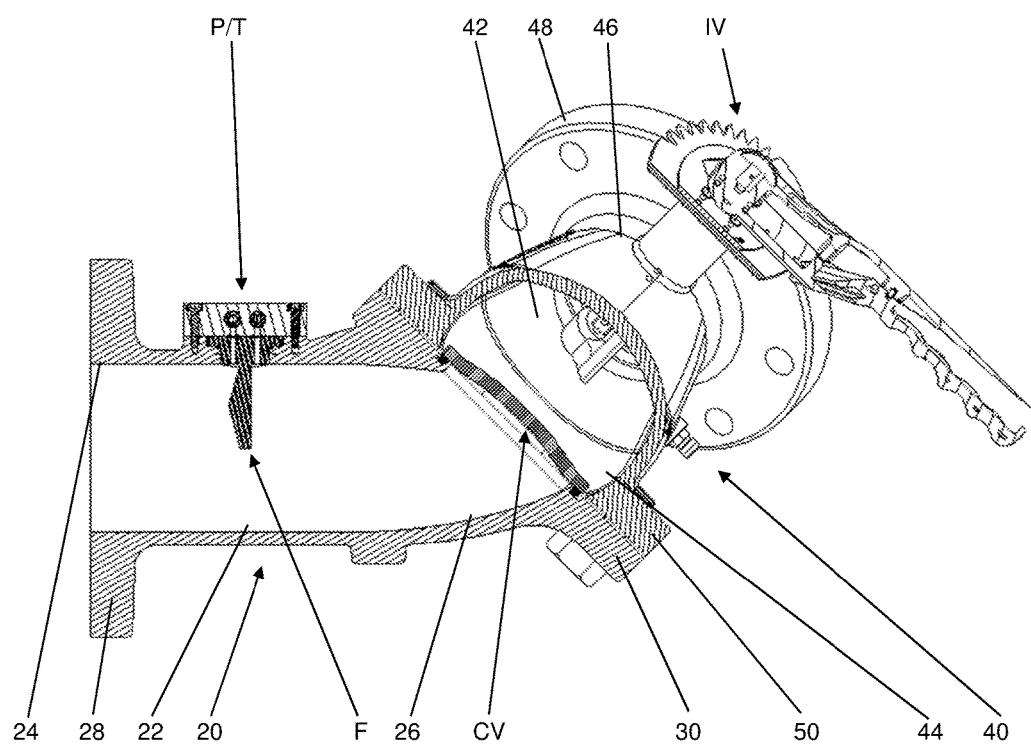
Figure 3A: Intermediate angle configuration

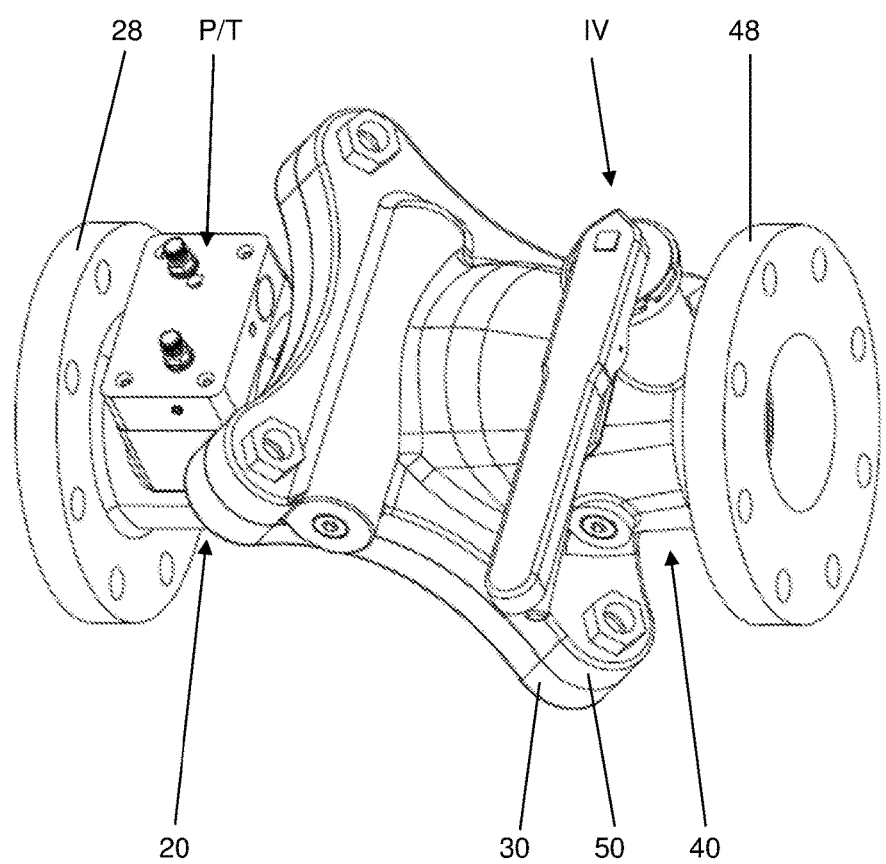
Figure 4A: Alternate flange design

COMBINED ISOLATION VALVE AND CHECK VALVE WITH INTEGRAL FLOW RATE PRESSURE, AND/OR TEMPERATURE MEASUREMENT AND FIELD CONFIGURABILITY

CROSS-REFERENCE TO RELATED APPLICATION

This application claims benefit to provisional patent application Ser. No. 62/425,289, filed 22 Nov. 2016, which is hereby incorporated by reference in its entirety.

BACKGROUND OF THE INVENTION

1. Field of the Invention

The present invention relates to a combine isolation and check valve; and more particularly, relates to a combine isolation and check valve for a hydronic system.

2. Brief Description of Related Art

Most hydronic HVAC systems require shut-off/isolation valves so maintenance can be performed, and check valves to ensure proper operation. Flow measurement devices are either permanently or temporarily installed to verify the system flow rate. When permanently installed in a hydronic HVAC system, these flow measurement devices take up extra space and increase the system head loss. Significant amounts of extra pipe length may be required depending on the type of flow measurement device being used. When employed, non-permanent means of flow rate measurement can be labor intensive and, depending on the type of technology used, present varying degrees of accuracy, data portability, and opportunities for fluid leakage. Check valves and isolation/shut-off valves also take up space and increase system head loss.

SUMMARY OF THE INVENTION

In summary, the present invention allows for a combination valve in a hydronic HVAC system that functions as an isolation valve; a check valve; and as a means for measuring fluid parameters, such as flow rate, pressure, and/or temperature. The present invention also allows for the isolation valve to be configured in the field to be mounted either in a straight 180° or an angled 90° orientation, as well as at an intermediate angle.

The new combination of isolation valve, check valve, with embedded sensors for flow rate, pressure, and/or temperature measurement provides a more compact product envelope that achieves space savings, e.g., by eliminating the need for separate components in an HVAC system, such as separate isolation valves, check valves, flow meters, pressure gages, and/or thermometers.

When acting as a positive shut-off isolation valve, the combination valve will prevent fluid flow in any direction so that maintenance can be performed on the pump or system. An optimized contoured isolation valve disc minimizes the impact the isolation feature has on the total combination valve pressure drop when fully open. When acting as a check valve, the combination valve will prevent backflow and gravity circulation, which is harmful to pump or system operation when it occurs.

Flow measurement would occur through an embedded electromagnetic, electromechanical, or mechanical flow measurement device used in possible combination with the pressure and/or temperature measurements.

Field configurability is achieved via a flanged connection joining an upstream inlet half with a downstream outlet half of the valve. The flange is oriented in a way that, when joined, the valve body inlet and outlet are aligned in a straight (180°) configuration where the inlet and outlet share a common axis. The inlet body and outlet body can also be configured by the user such that the outlet of the valve is perpendicular (90°) to the inlet. Intermediate angle configurations are also possible.

One embodiment of this combination valve will incorporate all of these features in as compact an envelope as possible to save space and energy when installed. Flow rate, pressure, and/or temperature measurement features that are embedded into this valve will eliminate the possibility of leakage that normally exists when probes are inserted into the valve or system accessory to measure the internal fluid pressure or temperature. Likewise, this combination valve will produce a single head loss location for system design considerations.

Specific Embodiments

By way of example, and according to some embodiments, the present invention may include, or take the form of, a combination valve having one or more embedded measurement sensors, a check valve and an isolation valve featuring a valve body inlet and a valve body outlet.

The valve body inlet may include a pipe portion with an inlet portion for receiving a fluid flow and an outlet portion for providing the fluid flow from the valve body inlet, and being configured to extend along a pipe portion axis. The valve body inlet may include an inlet flange portion coupled to the inlet portion and extended outwardly perpendicular to the pipe portion axis for coupling to input piping providing the fluid flow. The valve body inlet may include an outlet flange portion coupled to the outlet portion and extended outwardly and obliquely with respect to both the pipe portion axis and the corresponding pipe portion axis at an angle of about 45°.

The valve body outlet may include a corresponding pipe portion with a corresponding inlet portion for receiving the fluid flow from the valve body inlet and a corresponding outlet portion for providing the fluid flow from the valve body outlet, and being configured to extend along a corresponding pipe portion axis. The valve body outlet may include a corresponding outlet flange portion coupled to the corresponding outlet portion for coupling to output piping receiving the fluid flow from the combination valve and extended outwardly perpendicular to the corresponding pipe portion axis. The valve body outlet may include a corresponding inlet flange portion coupled to the corresponding inlet portion of the valve body outlet, extended outwardly and obliquely to the corresponding pipe portion axis at an angle of about 45°, and configured to couple to the outlet flange portion of the valve body inlet, so that the valve body inlet and the valve body outlet can be mount in either a straight 180° orientation with respect to the pipe portion axis of the valve body inlet and the corresponding pipe axis of the valve body outlet, which are substantially parallel with respect to one another, or an angled 90° orientation with respect to the pipe portion axis of the valve body inlet and the corresponding pipe axis of the valve body outlet, which are substantially perpendicular with respect to one another, or an intermediate angled orientation between 90° and 180° orientation with respect to the pipe portion axis of the valve body inlet and the corresponding pipe axis of the valve body outlet, which are at an oblique angle between 90° and 180° with respect to one another.

The combination valve may include one or more of the following features:

The valve body inlet may include the one or more embedded measurement sensors, including where the one or more embedded measurement sensors are configured to sense some combination of flow rate, temperature, or pressure in fluid flowing thru the combination valve.

The valve body outlet may include the check valve, the isolation valve, or both.

The outlet flange portion of the valve body inlet and the corresponding inlet flange portion of the valve body outlet may be configured with corresponding openings for receiving bolts to couple together the outlet flange portion and the corresponding inlet flange portion.

The corresponding openings may be configured in four corners so that the corresponding inlet flange portion of the valve body outlet can be mounted to the corresponding inlet portion of the valve body inlet in either the straight 180° orientation, or the angled 90° orientation, or the intermediate angled orientation.

BRIEF DESCRIPTION OF THE DRAWING

The drawing, which is not necessarily drawn to scale, includes the following Figures:

FIGS. 1A thru 1D show the combination valve where the valve body inlet and the valve body outlet are coupled together in a straight or 180° orientation, including where FIG. 1A shows a side cross-sectional view of the combination valve; where FIG. 1B shows a diagram of the combination valve having the pressure sensor, flow measurement, temperature sensor, check valve and isolation shut-off, all arranged along a common axis; where FIG. 1C shows a top perspective view of the combination valve shown in FIG. 1A; and where FIG. 1D shows a side view of the combination valve shown in FIG. 1A, all according to some embodiments of the present invention.

FIGS. 2A thru 2D show the combination valve where the valve body inlet and the valve body outlet are coupled together in a perpendicular or 90° orientation, including where FIG. 2A shows a side cross-sectional view of the combination valve; where FIG. 2B shows a diagram of the combination valve having the pressure sensor, flow measurement and temperature sensor arranged on one axis and the check valve and isolation shut-off arranged along a perpendicular axis; where FIG. 2C shows a top perspective view of the combination valve shown in FIG. 2A; and where FIG. 2D shows a side view of the combination valve shown in FIG. 2A, all according to some embodiments of the present invention.

FIGS. 3A thru 3C show the combination valve where the valve body inlet and the valve body outlet are coupled together in an intermediately-angled orientation, including where FIG. 3A shows a partial cross-sectional view of the combination valve; where FIG. 3B shows a top perspective view of the combination valve shown in FIG. 3A; and where FIG. 3C shows a side view of the combination valve shown in FIG. 3A, all according to some embodiments of the present invention.

FIGS. 4A thru 4C show an alternate flange design for the combination valve where the valve body inlet and the valve body outlet are respectively coupled together similar to the angular orientation in FIGS. 1A thru 1D, 2A thru 2D and 3A thru 3C, including where FIG. 4A shows a top perspective view of the combination valve having a straight or 180° orientation similar to that shown in FIGS. 1A thru 1D; where FIG. 4B shows a top perspective view of the combination valve having a perpendicular or 90° orientation similar to that shown in FIGS. 2A thru 2D; and where FIG. 4C shows a side view of the combination valve having an intermediately-angled orientation similar to that shown in FIG. 3A thru 3C, all according to some embodiments of the present invention.

Similar parts in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Figure 1B:
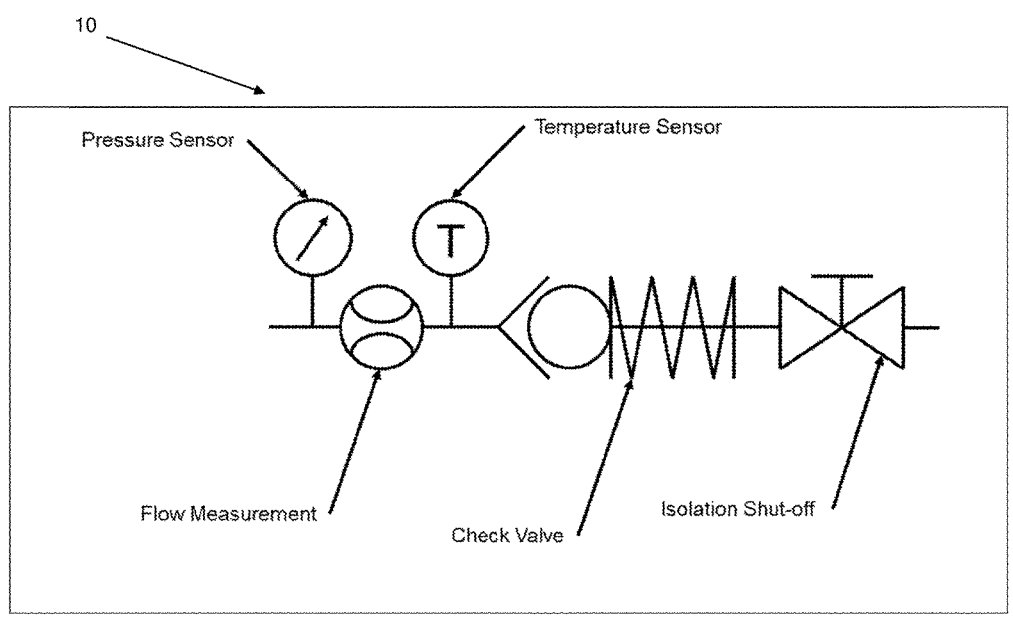
Figure 1C:
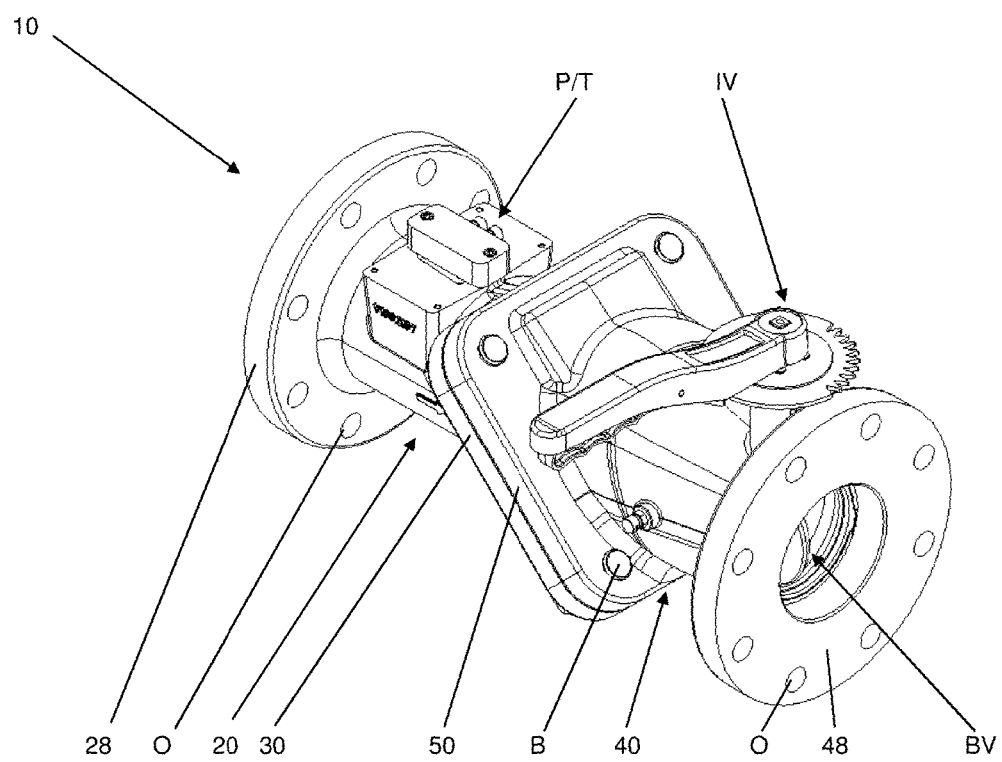
Figure 1D:
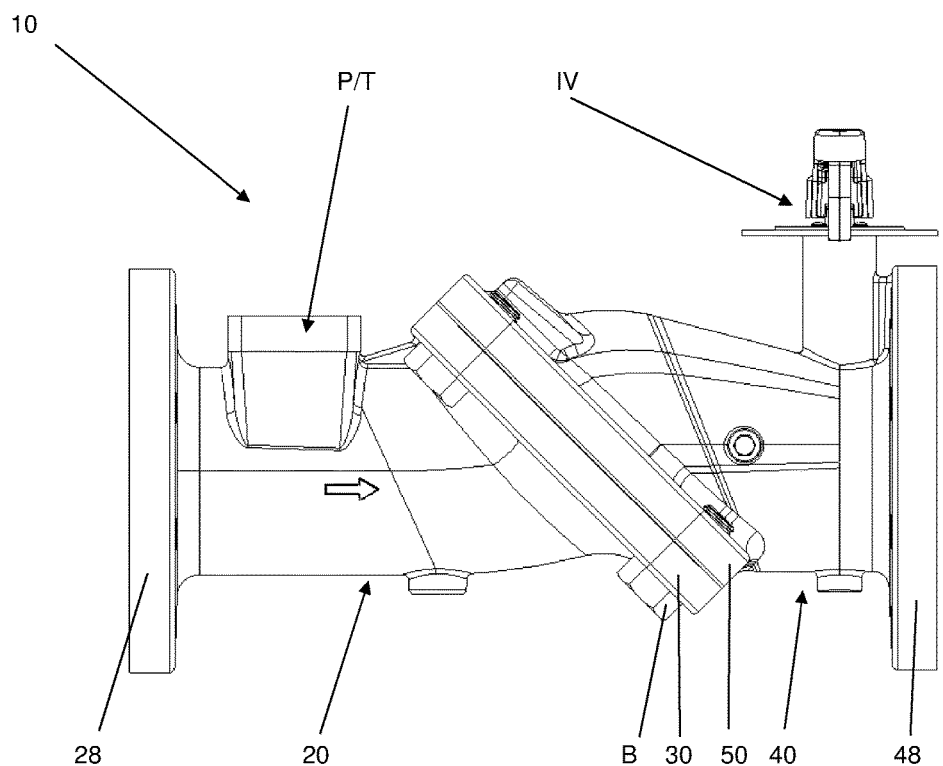

By way of example, according to some embodiments, FIGS. 1A thru 1D show the present invention in the form of a combination valve generally indicated as 10 having one or more embedded measurement sensors P, T, F, a check valve CV and an isolation valve IV featuring a valve body inlet 20 and a valve body outlet 40.

The Valve Body Inlet 20

The valve body inlet 20 includes a pipe portion 22 having an inlet portion 24 for receiving a fluid flow and an outlet portion 26 for providing the fluid flow from the valve body inlet 20. The pipe portion 22 may be configured to extend along a pipe portion axis A.

The valve body inlet 20 includes an inlet flange portion 28 coupled to the inlet portion 24 and extending outwardly perpendicular to the pipe portion axis A for coupling to input piping (not shown) providing the fluid flow.

The valve body inlet 20 includes an outlet flange portion 30 coupled to the outlet portion 26, and extended outwardly and obliquely with respect to the pipe portion axis A at an angle of about 45°. In FIG. 1A, see the plane defined by the arrows a-a in relation to the pipe portion axis A and the corresponding pipe portion axis A'.

The Valve Body Outlet 40

The valve body outlet 40 includes a corresponding pipe portion 42 with a corresponding inlet portion 44 for receiving the fluid flow from the valve body inlet 20 and a corresponding outlet portion 46 for providing the fluid flow from the valve body outlet 40, and being configured to extend along a corresponding pipe portion axis A'.

The valve body outlet 40 includes a corresponding outlet flange portion 48 coupled to the corresponding outlet portion 46 for coupling to output piping (not shown) for receiving the fluid flow from the combination valve 10, and extending outwardly perpendicular to the corresponding pipe portion axis A'.

The valve body outlet 40 includes a corresponding inlet flange portion 50 coupled to the corresponding inlet portion 44 of the valve body outlet 40, extended outwardly and obliquely with respect to the corresponding pipe portion axis A' at an angle of about 45°, and configured to couple to the outlet flange portion 30 of the valve body inlet 20 for connecting the valve body inlet 20 and valve body outlet 40 together, e.g., using bolts. Again, in FIG. 1A, see the plane defined by the arrows a-a in relation to the pipe portion axis A and the corresponding pipe portion axis A'.

The Valve Body Inlet/Outlet Orientation

In operation, the valve body inlet 20 and the valve body outlet 40 can be mounted (e.g., in the field by a field technician) in one of the following orientations:

1) a straight 180° orientation with respect to the pipe portion axis A of the valve body inlet 20 and the corresponding pipe axis A' of the valve body outlet 40, which are substantially parallel with respect to one another, e.g., as shown in FIGS. 1A thru 1D and 4A; or
2) an angled 90° orientation with respect to the pipe portion axis A of the valve body inlet 20 and the corresponding pipe axis A' of the valve body outlet 40, which are substantially perpendicular with respect to one another e.g., as shown in FIGS. 2A thru 2D and 4B; or
3) an intermediate angled orientation between 90° and 180° with respect to the pipe portion axis A of the valve body inlet 20 and the corresponding pipe axis A' of the valve body outlet 40, which are at an oblique angle between 90° and 180° with respect to one another, e.g., as shown in FIGS. 3A thru 3C and 4C.

Other Features

The valve body inlet 20 may include the one or more embedded measurement sensors P, T, F, including where the one or more embedded measurement sensors are configured to sense some combination of flow rate, temperature, or pressure in fluid flowing thru the combination valve 10. Embodiments are envisioned, and the scope of the invention is intended to include, where the valve body outlet 40 may include the one or more embedded measurement sensors P, T, F.

By way of example, and according to some embodiments, the valve body outlet 40 may include the check valve CV, the isolation valve IV, or both, e.g., consistent with that shown in the drawing. Embodiments are envisioned, and the scope of the invention is intended to include, where the valve body inlet 20 may include the check valve CV, the isolation valve IV, or both. By way of example, the isolation valve IV is shown in FIG. 1A as a ball valve BV, although the scope of the invention is intended to include other types or kinds of isolation valves either now known or later developed in the future.

The flange portions 28, 30 and the corresponding flange portions 48, 50 may be configured with corresponding openings O for receiving bolts B to couple together, e.g., like the outlet flange portion 30 and the corresponding inlet flange portion 50 as shown.

By way of example, and according to some embodiments of the present invention, and consistent with that shown, the corresponding openings O may be configured in four corners so that the corresponding inlet flange portion 50 of the valve body outlet 40 can be mounted to the outlet flange portion 28 of the valve body inlet 20 in either the straight 180° orientation, or the angled 90° orientation, or the intermediate angled orientation. Embodiments are envisioned, and the scope of the invention is intended to include, where the outlet flange portion 30 and the corresponding inlet flange portion 50 may be configured with more or less than four opening and coupled together with more or less than four bolts, e.g., within the spirit of the present invention.

FIGS. 2A Thru 4C

FIGS. 2A thru 4C show the other configurations/orientations and include reference labels corresponding to the labelling of the parts/components in FIGS. 1A thru 1D.

Figure 2B:
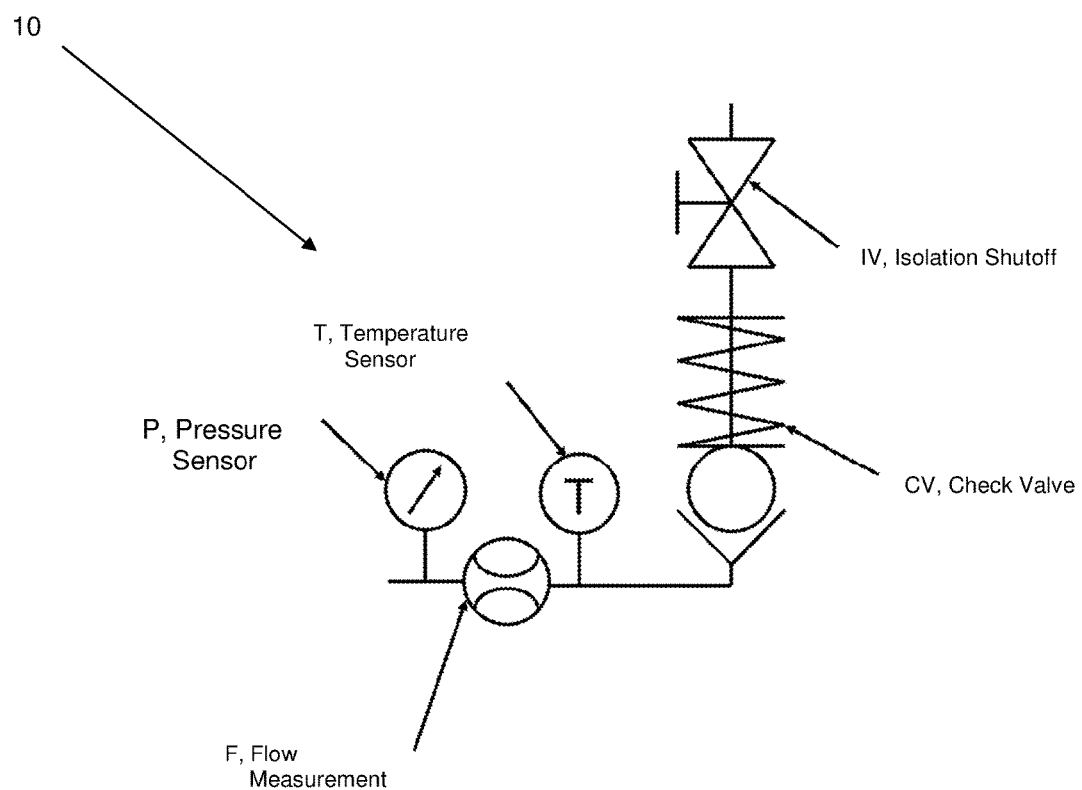
Figure 2C:
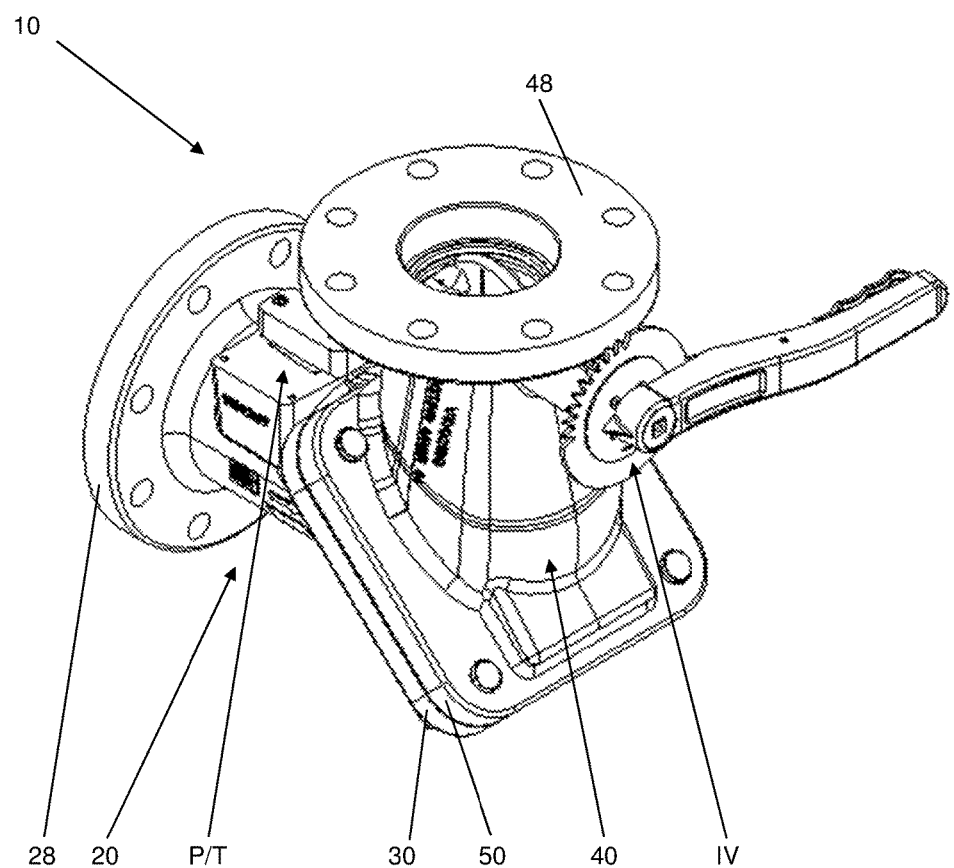
Figure 2D:
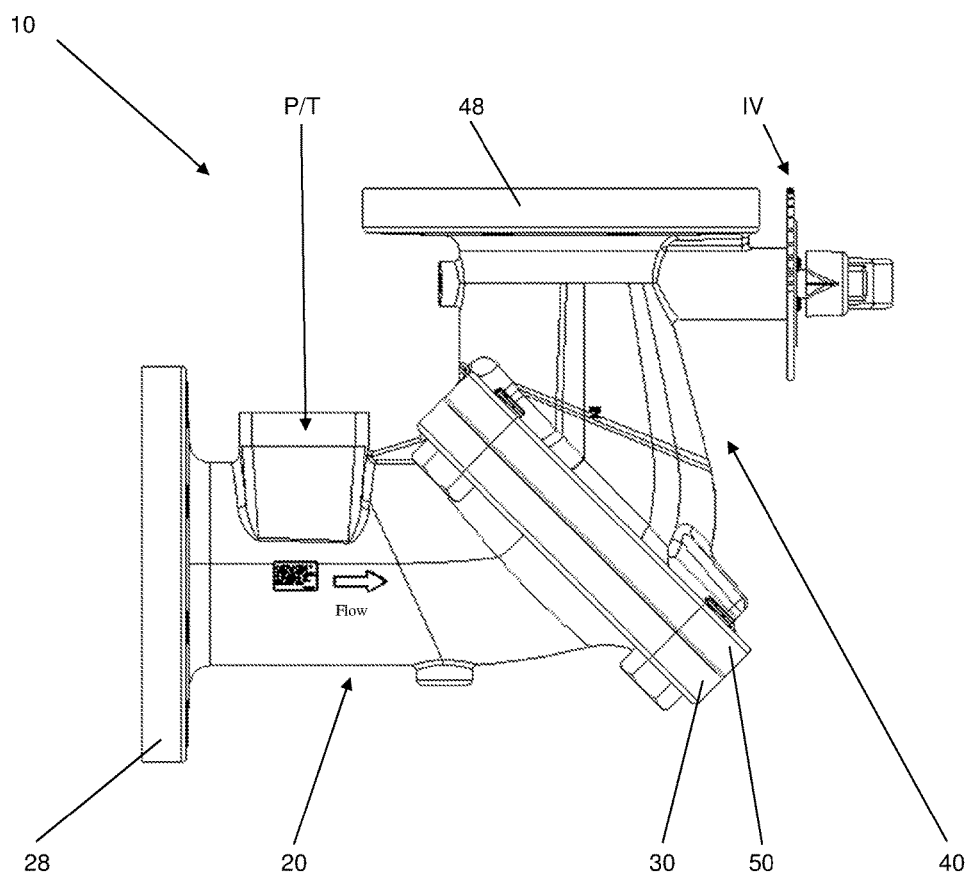

FIGS. 2A thru 2D show the combination valve 10 where the valve body inlet 20 and the valve body outlet 40 are coupled together in a perpendicular or 90° orientation. FIG. 2B shows the combination valve 10 having the pressure sensor P, flow measurement device F and temperature sensor T arranged on one axis and the check valve CV and isolation shut-off valve IV arranged along a perpendicular axis.

Figure 3B:
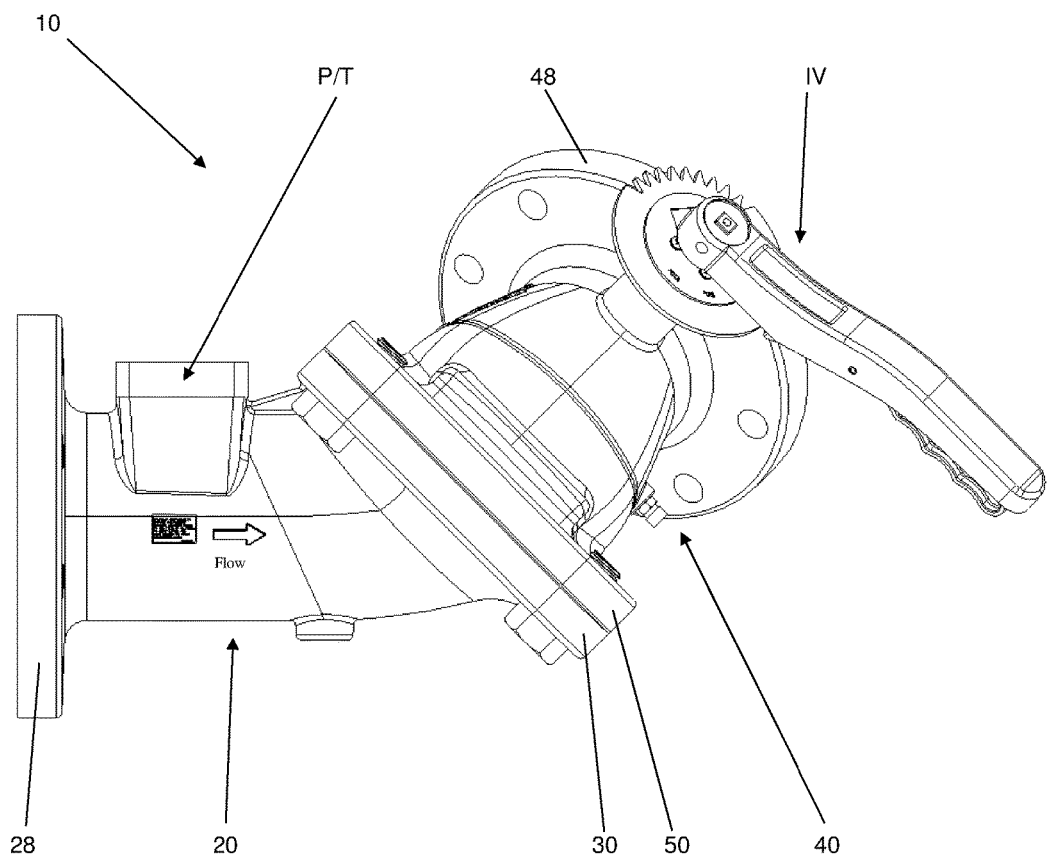
Figure 3C:
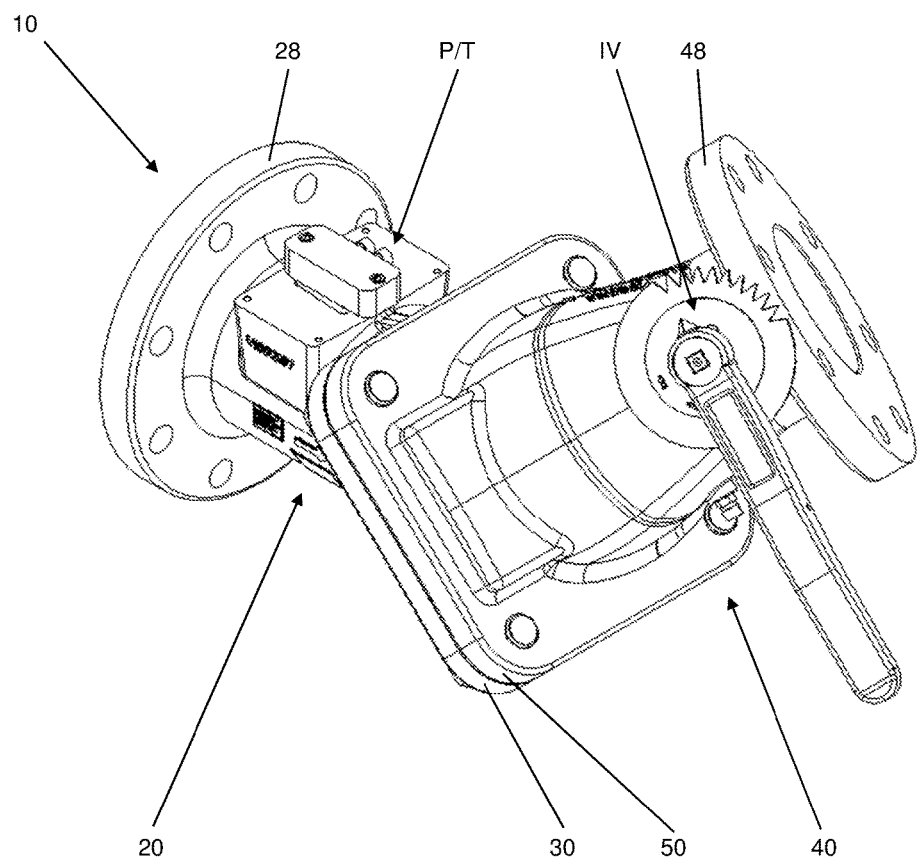

FIGS. 3A thru 3C show the combination valve 10 where the valve body inlet 20 and the valve body outlet 40 are coupled together in an intermediately-angled orientation.

Figure 4B:
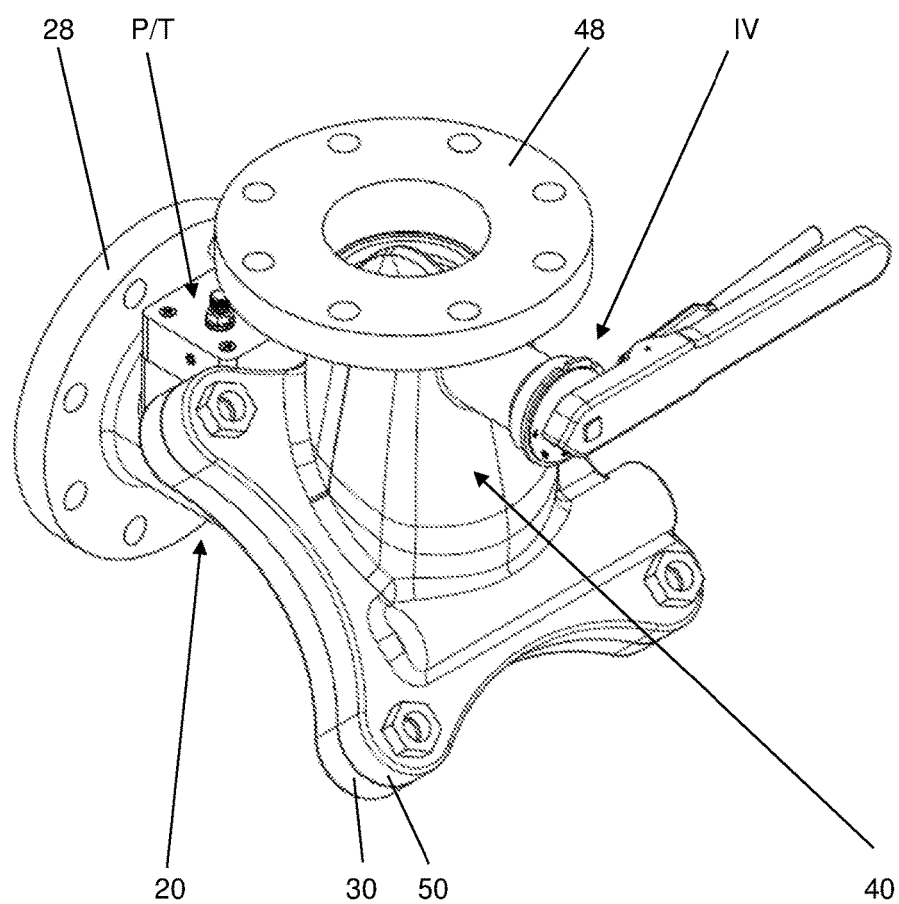
Figure 4C:
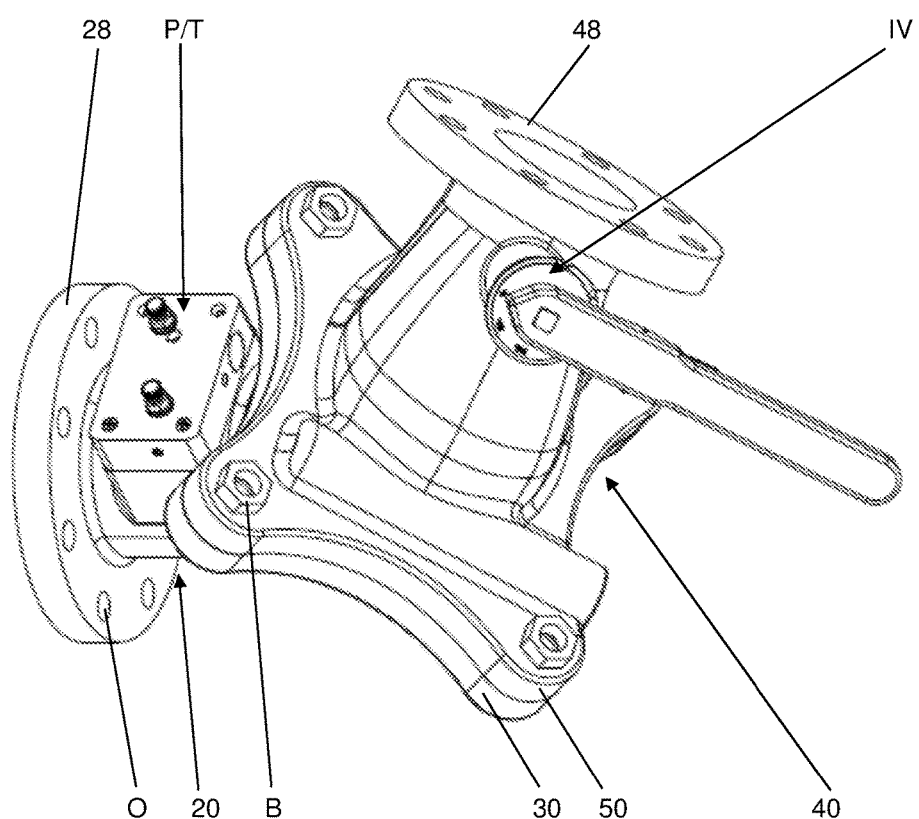

FIGS. 4A thru 4C show an alternate flange design for the combination valve where the valve body inlet 20 and the valve body outlet 40 are respectively coupled together similar to the angular orientation in FIGS. 1A thru 1D, 2A thru 2D and 3A thru 3C. For example, FIG. 4A shows the combination valve 10 having a straight or 180° orientation similar to that shown in FIGS. 1A thru 1D; FIG. 4B shows the combination valve 10 having a perpendicular or 90° orientation similar to that shown in FIGS. 2A thru 2D; and FIG. 4C shows the combination valve 10 having an intermediately-angled orientation similar to that shown in FIG. 3A thru 3C.

Check Valve, Isolation Valve, Pressure, Temperature and Flow Sensors

Check valves like element CV, isolation valves like element IV and pressure, temperature and flow valves like elements P, T, F are known in the art, and the scope of the invention is not intended to be limited to any particular type or kind thereof either now known or later developed in the future. By way of further example, see the other related applications identified below.

Other Related Applications

By way of example, this application also relates to patent application Ser. No. 15/173,798 (911-019.021-2//F-B&G-X0021), filed 6 Jun. 2016, which claims benefit to application Ser. No. 62/171,023, filed 4 Jun. 2015; patent application Ser. No. 15/262,430 (911-019.023-2//F-B&G-X0023), filed 12 Sep. 2016, which claims benefit to application Ser. No. 62/217,355, filed 11 Sep. 2015; as well as patent application Ser. No. 15/715,779 (911-019.029-2//F-B&G-X0029)//, filed 26 Sep. 2017, which claims benefit to application Ser. No. 62/399,614, filed 26 Sep. 2016, which are all incorporated by reference in their entirety.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A combination valve having one or more embedded measurement sensors, a check valve and an isolation valve, comprising:
   a) a valve body inlet (VBI) having
      a VBI pipe portion with a VBI inlet portion for receiving a fluid flow and a VBI outlet portion for providing the fluid flow from the valve body inlet, and being configured to extend along a VBI pipe portion axis,
      a VBI inlet flange portion coupled to the VBI inlet portion and extending outwardly perpendicular to the VBI pipe portion axis for coupling to input piping providing the fluid flow, and
      a VBI outlet flange portion coupled to the VBI outlet portion and extending outwardly and obliquely to the VBI pipe portion axis at a VBI an angle of substantially 45°; and
   b) a valve body outlet (VBO) having
      a VBO pipe portion with a VBO inlet portion for receiving the fluid flow from the valve body inlet and a VBO outlet portion for providing the fluid flow from the valve body outlet, and being configured to extend along a VBO pipe portion axis,
      a VBO outlet flange portion coupled to the VBO outlet portion for coupling to output piping for receiving the fluid flow from the combination valve and extended outwardly perpendicular to the VBO pipe portion axis, and
      a VBO inlet flange portion coupled to the VBO inlet portion of the valve body outlet, extended outwardly and obliquely to the VBO pipe portion axis at a VBO angle of substantially 45°, and configured to couple to the VBO outlet flange portion of the valve body inlet, so that the valve body inlet and the valve body outlet can be mount in either
      a straight 180° orientation with respect to the VBI pipe portion axis of the valve body inlet and to the VBO pipe axis of the valve body outlet, which are substantially parallel with respect to one another, or
      an angled 90° orientation with respect to the VBI pipe portion axis of the valve body inlet and the VBO pipe axis of the valve body outlet, which are substantially perpendicular with respect to one another, or
      an intermediate angled orientation between 90° and 180° with respect to the VBI pipe portion axis of the valve body inlet and the VBO pipe axis of the valve body outlet, which are at an oblique angle between 90° and 180° with respect to one another.

2. The combination valve according to claim 1, wherein the valve body inlet comprises the one or more embedded measurement sensors, including where the one or more embedded measurement sensors are configured to sense some combination of flow rate, temperature, or pressure in fluid flowing thru the combination valve.

3. The combination valve according to claim 1, wherein the valve body outlet comprises the check valve.

4. The combination valve according to claim 1, wherein the valve body outlet comprises the isolation valve.

5. The combination valve according to claim 1, wherein the VBI outlet flange portion and the VBO inlet flange portion are configured with corresponding openings for receiving bolts to couple together the VBI outlet flange portion and the VBO inlet flange portion.

6. The combination valve according to claim 5, wherein the corresponding openings are configured in four corners so that the VBO inlet flange portion of the valve body outlet can be mounted to the VBI inlet portion of the valve body inlet in either the straight 180° orientation, or the angled 90° orientation, or the intermediate angled orientation.

* * * * *

UNITED STATES PATENT AND TRADEMARK OFFICE
CERTIFICATE OF CORRECTION

PATENT NO.        : 10,443,880 B2
APPLICATION NO.   : 15/821084
DATED             : October 15, 2019
INVENTOR(S)       : Stanley Paul Evans et al.

Page 1 of 1

It is certified that error appears in the above-identified patent and that said Letters Patent is hereby corrected as shown below:

In the Claims

In Column 7, Line 25, Claim 1, Line 16, "an" should be deleted.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*